(No Model.)
F. G. KINCAID & C. A. CHANDLER.
FAUCET SOCKET.
No. 291,603. Patented Jan. 8, 1884.
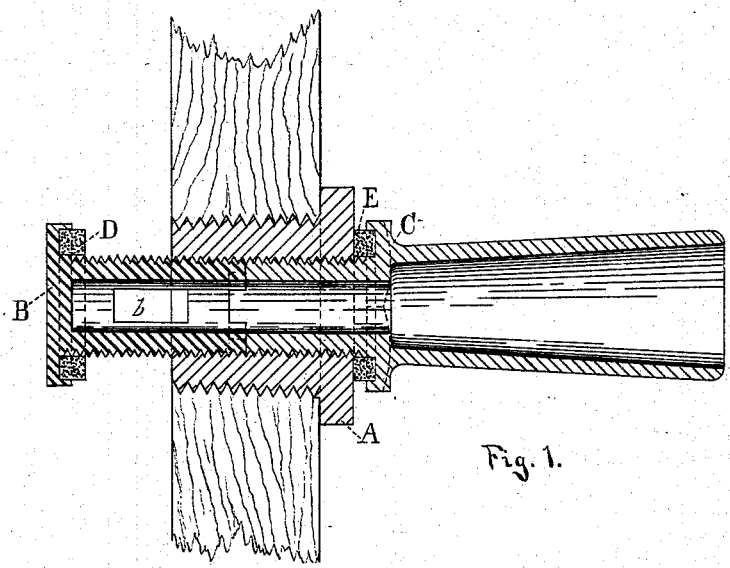
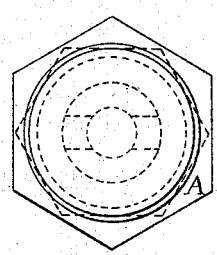
Fig. 2.
Fig. 1.
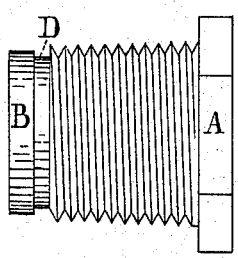
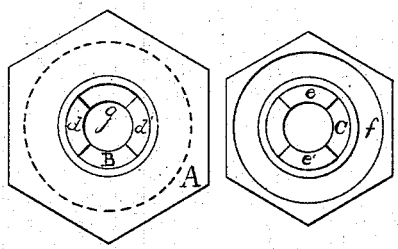
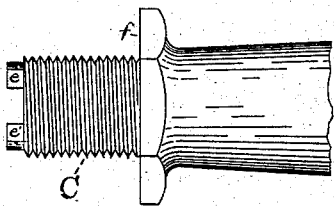
Fig. 3.
Fig. 4.
Fig. 6.
Fig. 5.
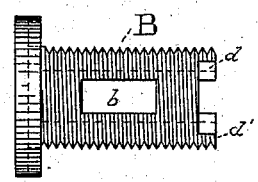
Fig. 7.
Witnesses.
C. W. Wheaton
C. J. Driscoll
Inventors.
Frank G. Kincaid
Clarence A. Chandler

UNITED STATES PATENT OFFICE.

FRANK G. KINCAID, OF SOMERVILLE, AND CLARENCE A. CHANDLER, OF EAST BRIDGEWATER, MASSACHUSETTS.

FAUCET-SOCKET.

SPECIFICATION forming part of Letters Patent No. 291,603, dated January 8, 1884.

Application filed February 15, 1883. (No model.)

*To all whom it may concern:*

Be it known that we, FRANK G. KINCAID and CLARENCE A. CHANDLER, citizens of the United States, residing, respectively, at Somerville, in the county of Middlesex and State of Massachusetts, and at East Bridgewater, in the county of Plymouth and said State, have invented a new and useful Improvement in Faucet-Sockets, of which the following is a specification.

Our invention is designed to be used in connection with barrels or other receptacles from which liquids are drawn through faucets, and is to remain attached to the receptacle after the faucet has been detached.

The objects of our invention are, first, to make a faucet-socket which can be easily and strongly attached to a barrel or other receptacle from without, and which can be made either to remain so perfectly tight as to prevent the escape of any liquid through it, or by a simple adjustment to form an open passage through which liquid may freely escape from the receptacle; second, to make a faucet-socket which will securely hold a faucet against all ordinary pressure, and which will, by the act of inserting the faucet, be adjusted to form an unobstructed passage through it, which will be firmly closed by the act of withdrawing the faucet. We attain these objects by the instrumentalities represented in the accompanying drawings, in which—

Figure 1 represents a longitudinal section of a part of a barrel-head with faucet-socket and end of faucet. Fig. 2 represents an end view of Fig. 1. Fig. 3 represents a side view of faucet-socket when closed. Fig. 4 represents a plan of faucet-socket as viewed from its larger end. Fig. 5 represents a side view of that end of the faucet which is designed to enter the socket. Fig. 6 represents an end view of Fig. 5. Fig. 7 represents a side view of the valve which closes the faucet-socket.

Similar letters refer to the same parts throughout the several views.

In the drawings, A represents the shell or outside part of the socket, which has at its center a tapped hole extending its entire length. The socket is provided with a hexagonal head, and is slightly tapered and coarsely threaded on the outside.

B represents the valve which closes the passage through the faucet-socket when the faucet is not attached. It is threaded to fit the hole in A, and has on one end a head larger in diameter than the rest of the valve. The shoulder formed by this head is slightly chambered. A hole, $g$, extends laterally from the smaller end of this valve only far enough to intersect with another hole (represented by $b$) which extends transversely through the cylindrical part of the valve about midway its length. On the smaller end of this valve there are teeth extending laterally. These teeth are represented by $d\, d'$.

D and E represent washers.

C represents what we term the "end" of the faucet. It can be made a part of the faucet itself, or, as is here represented, a piece which may be firmly attached to the faucet by being driven onto one end of it, there to remain as a fixture. It is threaded to fit the tapped hole in A, and has teeth $e\, e'$, which are similar to and made to mesh with the teeth $d\, d'$ on the valve B. It has a shoulder, $f$, above the threaded part referred to, which is slightly chambered.

The operation of our invention is as follows: A suitable hole having been made in a barrel or other receptacle, the socket is screwed firmly into it, with its valve B in the position shown in Fig. 3. The faucet is then placed in such a position that the teeth $e\, e'$ mesh with the teeth $d\, d'$. It is then screwed securely into the socket A. The motion of the faucet C, as it is being screwed into the socket, is by means of the teeth $e\, e'$ and $d\, d'$ communicated to the valve B, causing it to be screwed sufficiently out of the socket A on the inside of the barrel to allow a free passage between the barrel and the faucet. The act of unscrewing the faucet will, by means of the teeth referred to, screw the valve B into the socket, and thus close the passage through it. The washers D and E are to insure tight joints, and the chambers in the head of the valve B and in the shoulder near the end of the faucet C are to protect the washers.

It will be seen that the shoulder $f$ is an integral part of the faucet C, and that by chambering it, as well as the head of the valve B, all liability of the spreading or splitting of the washers or packing when the same is screwed "home" is avoided.

We are also enabled by making the faucet in the manner described to do away with locking-nuts, springs, and other devices heretofore employed for forcing the packing on the faucet against the head of the keg.

Having described our invention, what we claim as new, and desire to secure by Letters Patent, is—

The combination, with the slightly-tapering shell or bushing A, externally and internally screw-threaded, as described, and provided with a polygonal head, of externally-screw-threaded valve B, provided with a chambered head, and having holes or ports $g$ and $b$ and lateral teeth, washer D, the faucet C, provided with the shoulder $f$, integral therewith, and chambered, as described, and having teeth $e\ e'$, and washer E, all constructed and operating substantially as and for the purpose set forth.

FRANK G. KINCAID.
CLARENCE A. CHANDLER.

Witnesses:
C. M. WHEATON,
C. J. DRISCOLL.